US010110934B1

(12) United States Patent
Schmidt et al.

(10) Patent No.: US 10,110,934 B1
(45) Date of Patent: Oct. 23, 2018

(54) PROACTIVELY PROVIDING CONTENT FOR CONTENT DISTRIBUTION NETWORKS

(71) Applicant: Verizon Patent and Licensing Inc., Arlington, VA (US)

(72) Inventors: Walter John Schmidt, Dallas, TX (US); Kevin Shen, Sunnyvale, CA (US); Joseph F. Einstein, Los Angeles, CA (US); Hayes Kim, Porter Ranch, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/478,731

(22) Filed: Apr. 4, 2017

(51) Int. Cl.
| H04N 21/2183 | (2011.01) |
| H04N 21/2343 | (2011.01) |
| H04L 29/06 | (2006.01) |
| H04L 29/08 | (2006.01) |
| H04N 21/2187 | (2011.01) |
| H04N 21/4402 | (2011.01) |
| H04N 21/222 | (2011.01) |

(52) U.S. Cl.
CPC .  *H04N 21/234309* (2013.01); *H04L 65/4092* (2013.01); *H04L 65/602* (2013.01); *H04L 67/2842* (2013.01); *H04N 21/2183* (2013.01); *H04N 21/2187* (2013.01); *H04N 21/222* (2013.01); *H04N 21/440218* (2013.01)

(58) Field of Classification Search
CPC ....... H04N 21/234309; H04N 21/2183; H04N 21/2187; H04N 21/222; H04N 21/440218; H04L 65/4092; H04L 65/602; H04L 67/2842
See application file for complete search history.

(56) References Cited

U.S. PATENT DOCUMENTS

| 2003/0005444 | A1* | 1/2003 | Crinon | H04N 21/8166 |
| | | | | 725/50 |
| 2013/0089033 | A1* | 4/2013 | Kahn | H04W 28/22 |
| | | | | 370/329 |
| 2014/0207912 | A1* | 7/2014 | Thibeault | H04L 67/2847 |
| | | | | 709/219 |
| 2015/0244769 | A1* | 8/2015 | Khaimov | H04L 67/2842 |
| | | | | 709/217 |
| 2017/0188072 | A1* | 6/2017 | Major | H04N 21/2187 |

* cited by examiner

*Primary Examiner* — Pankaj Kumar
*Assistant Examiner* — Alexander Boyd

(57) ABSTRACT

A device can receive streaming content from an origin device. The device can identify a user device to potentially receive the streaming content and an edge device associated with the user device. The device can modify a format of the streaming content based on a format acceptable to the user device. The format of the streaming content can be modified to match the format acceptable to the user device. The device can proactively provide the streaming content to the edge device to cause the edge device to make the streaming content available to be provided for presentation on the user device. The streaming content can be proactively provided to the edge device before the user device requests the streaming content from the edge device.

20 Claims, 5 Drawing Sheets

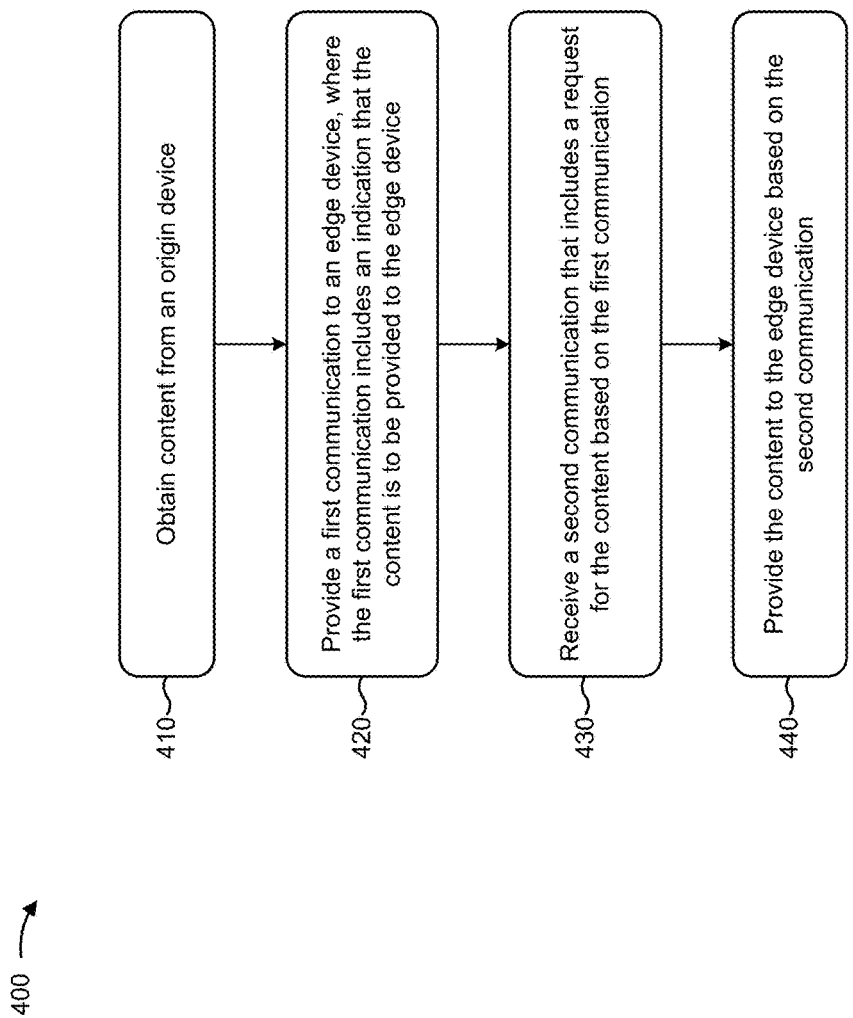

PROACTIVELY PROVIDING CONTENT FOR CONTENT DISTRIBUTION NETWORKS

BACKGROUND

A content distribution network (CDN) can be a globally distributed network of proxy servers deployed in multiple data centers. A goal of a CDN can be to serve content to end-users with high availability and high performance. CDNs serve Internet content, including web objects (e.g., text, graphics, scripts, etc.), downloadable objects (e.g., media files, software, documents, etc.), applications (e.g., e-commerce, portals, etc.), live streaming media, on-demand streaming media, and social network content.

BRIEF DESCRIPTION OF THE DRAWINGS

FIG. 4 is a flow chart of an example process for proactively providing content to an edge device.

DETAILED DESCRIPTION OF PREFERRED EMBODIMENTS

Figure 1A:
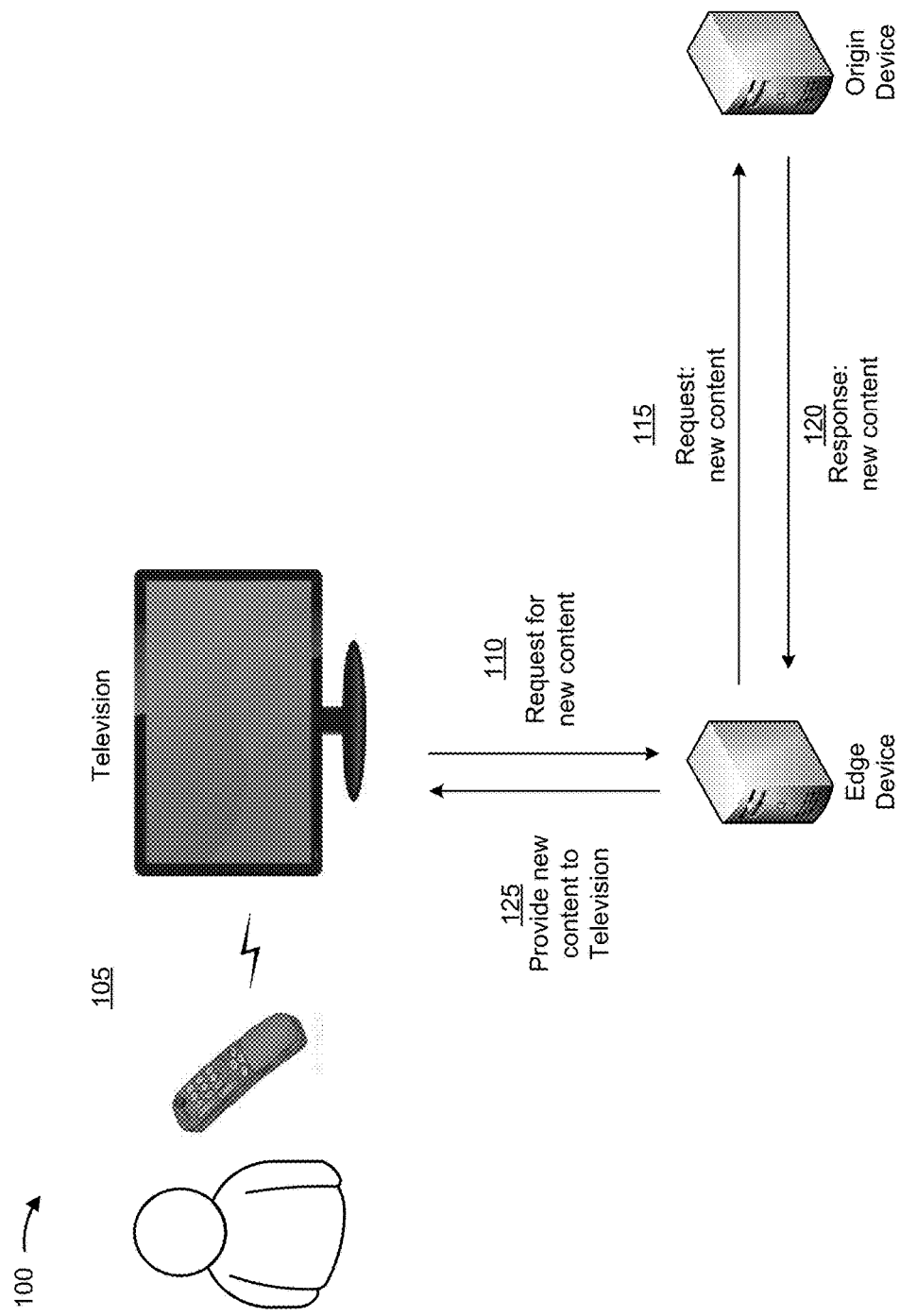
FIGS. 1A and 1B are diagrams of an overview of an example implementation described herein.

The following detailed description of example implementations refers to the accompanying drawings. The same reference numbers in different drawings can identify the same or similar elements.

A content provider can implement a content delivery network (CDN) to provide content to end users. The CDN can include a network of nodes (e.g., servers, proxy servers, an edge node, an edge server, etc.) deployed in one or more data centers. The CDN is intended to increase the speed at which content is provided to a user device by storing the content on a proxy server of the CDN and providing the stored content from the proxy server to the user device, rather than providing the content to the user device from an origin device (e.g., an origin server, a centralized server, etc.) that is the source of the content.

A CDN can store content at the proxy server of the CDN after the content is requested by the user device. For example, the user device can provide an initial request for content to the proxy server that is associated with (e.g., geographically closest to) the user device in the network associated with the CDN. The proxy server can determine that the server does not have the content stored in memory, and based on the initial request for content, the proxy server can provide a request to the centralized server so that the proxy server can receive the content. Once the proxy server receives the content from the centralized server, the proxy server can provide the content to the user device. For example, in a live television context, the CDN can periodically store portions of a live television stream at a proxy server after a user device requests the live television stream, which can enable digital video recorder (DVR) technology, and/or the like.

However, a CDN can involve a time delay that is noticeable and undesirable to a user when providing content to the user device. For example, the time delay involved for the proxy server of the CDN to receive the initial request for content from the user device, to request the content from the centralized server, to receive the content, and to provide the content to the user device can be noticeable and undesirable to a user. In some situations, the time delay can be particularly noticeable with regard to live television provided over the Internet. For example, the time delay can be between 3-10 seconds when the user is changing channels on a television that displays the live television. In addition, as the number of nodes in a CDN increases, there can be large numbers of requests for content to the centralized server that is the source of the content and the requests can overwhelm the centralized server, leading to further time delays.

Implementations described herein include a content server device that proactively provides content to an edge device of a CDN for storing at the edge device prior to a time when a user device requests the content. For example, the content server device can provide the content to the edge device in advance of any request from a downstream device. In some implementations, the content server device can format the content based on the user device and/or the edge device. The content server device can provide the content to the edge device based on communications between the content server device and the edge device. The edge device can store the content locally (e.g., in main memory, in cache memory, in secondary memory, etc.) on the edge device and/or on a storage component (e.g., tertiary storage, a hard disk drive (HDD), etc.) associated with the edge device so that the content can be provided to the user device, when requested, with less time delay as compared to a case without the content server device. In some implementations, the content can be live television and the content server device allows for less time delay when a user changes channels. In some implementations, the content server device and/or the edge device can store the content in cache memory, rather than main memory, which can further reduce the time delay associated with providing the content to the user device.

In this way, the content server device reduces the time delay between when a request for content is made by a user device and when the user device receives the content. In addition, the content server device can reduce network traffic and utilization of computing resources associated with the centralized server as a request for content might not need to be transmitted from the edge device to the centralized server that is the source of the content. The content server device can also reduce utilization of computing resources associated with an edge device by formatting the content based on the user device and/or the edge device.

Figure 1B:
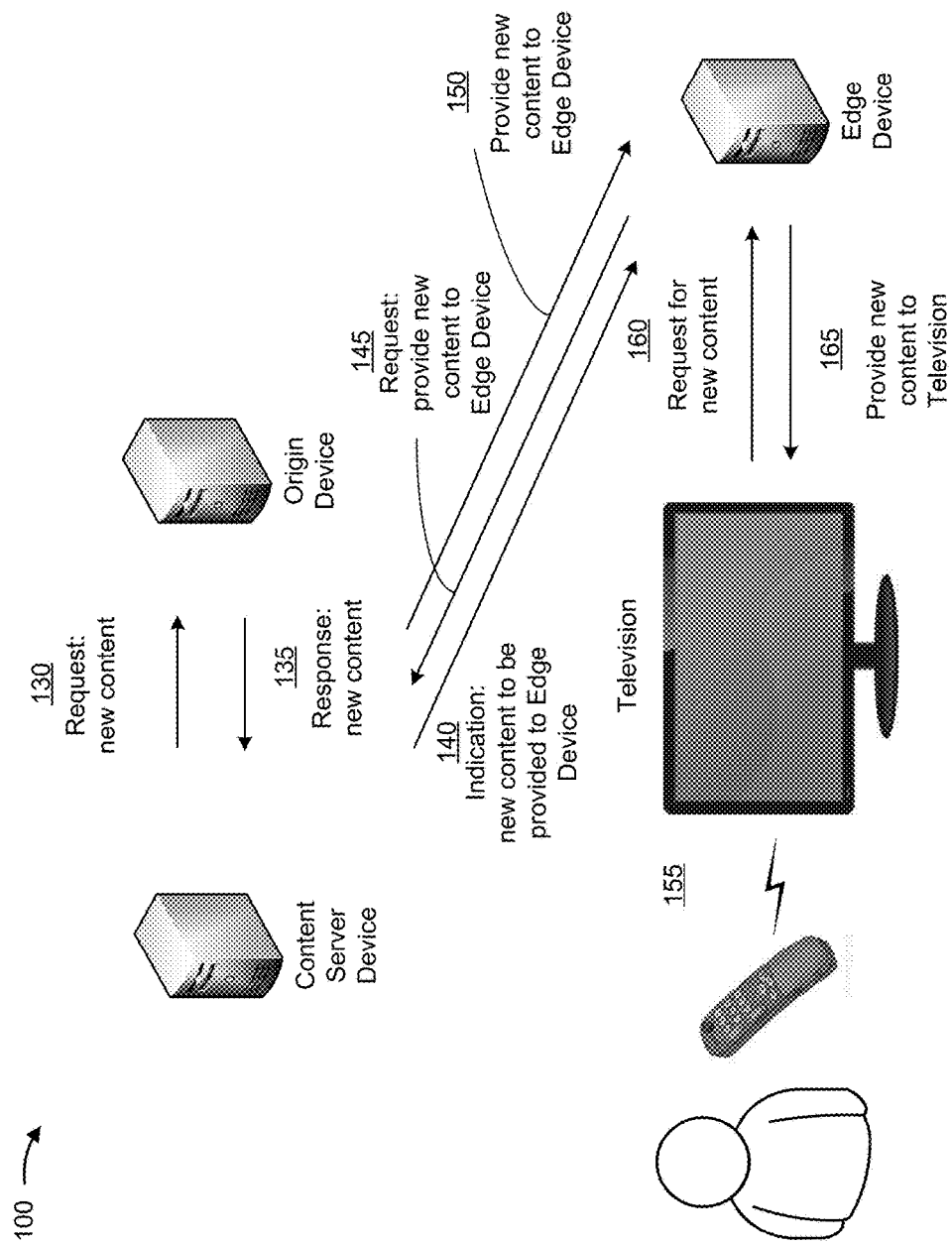

FIGS. 1A and 1B are diagrams of an overview of an example implementation 100 described herein. As shown in FIG. 1A, assume that a user is watching content (e.g., a first live television stream) that is provided via the Internet on a user device (e.g., a television). As shown by reference number 105, the user can change the channel on the television to watch new content (e.g., a second live television stream) using the remote associated with the television but the new content is not immediately displayed on the television. In some situations, the television can display an hour glass or another icon to indicate the new content is being retrieved.

As shown by reference number 110, the edge device can receive the initial request from the television for the new content based on the user changing the channel on the television. As shown by reference number 115, based on the initial request from the television, the edge device can provide a request for the new content to the origin device. As shown by reference number 120, the edge device can receive the new content from the origin device based on the request from the edge device. As shown by reference number 125, the edge device can provide the new content to the television for the television to display to the user. However, the television can display the new content only after a noticeable and undesirable time delay from when the user changed the channel on the television.

As shown in FIGS. 1B and 1*n* contrast to FIG. 1A, assume that a content server device has been placed between the origin device and the edge device. As shown by reference number 130, the content server device can provide a request (e.g., proactively) to the origin device to receive content (e.g., a live television stream) from the origin device. In some implementations, the request can be made to origin device 220 to receive content based on information associated with the content, the content server device, the edge device, the television, the user associated with the television, and/or other users. For example, the request can be based on the content that is most popular for the user and/or other users, a predicted interest of the user and/or of other users in the content, past viewing behavior of the user and/or of other users, the content being on a channel that is available for viewing based on a subscription, the subject matter of content provided by a channel currently being accessed, the content that is newly created, and/or the like.

In some implementations, the content server device can provide the request to the origin device periodically or non-periodically. For example, the content server device can provide the request based on information associated with the content (e.g., when a television program ends, when a television program begins, average duration of a television program, etc.).

By providing a request to the origin device non-periodically, the content server device can reduce network traffic and utilization of computing resources associated with providing the request to the origin device in comparison to periodically providing the request to the origin device.

As shown by reference number 135, the content server device can receive the content from the origin device. In some implementations, the content server device can format the content based on the user device and/or the edge device via which the content is to be received. In some implementations, the content server device can store the content locally (e.g., in main memory, in cache memory, in secondary memory, etc.) on the content server device and/or on a storage component (e.g., tertiary storage, a hard disk drive (HDD), etc.) associated with the content server device. For example, the content server device can store the content in cache memory of the content server device after receiving the content from the content server device. By storing the content in cache memory, the content server device can reduce an amount of time associated with the content server device providing the content to the edge device in comparison to storing the content in main memory based on the reduced amount of time the content server device takes to obtain the content from cache memory in comparison to main memory.

As shown by reference number 140, the content server device can provide a first communication to the edge device. For example, the content server device can provide a first communication to the edge device to indicate that the content is stored on the content server device. In some implementations, the first communication can include a list of content (e.g., a manifest list) that the content server device has stored and/or is receiving in real-time (e.g., live) from the origin device. As shown by reference number 145, the content server device can receive a second communication that includes a request for the content based on the first communication. For example, the content server device can receive a second communication from the edge device, based on the first communication, indicating that the edge device can receive the content. As shown by reference number 150, the content server device can provide the content to the edge device based on the second communication from the edge device.

In some implementations, the edge device can store the content locally (e.g., in main memory, in cache memory, etc.) on the edge device and/or on a storage component (e.g., tertiary storage, a hard disk drive (HDD), etc.) associated with the edge device. For example, the edge device can store the content in cache memory of the edge device after receiving the content from the content server device. By storing the content in cache memory, the edge device can reduce an amount of time associated with the edge device providing the content to the television in comparison to storing the content in main memory based on the reduced amount of time the edge device takes to obtain the content from cache memory in comparison to main memory.

As shown by reference number 155, assume that the user changes the channel on the television to watch new content (e.g., the live television stream) using the remote associated with the television. As shown by reference number 160, the edge device can receive a request from the television for the new content. As shown by reference number 165, the edge device can provide the new content to the television for the user to watch.

In this way, the new content can be provided to the television with less time delay than when content server device is not present. Less time delay can be based on the content server device providing the new content to the edge device proactively (e.g., before the new content is requested by the television) and the edge device storing the new content prior to the request for the new content being received from television. In addition, the content server device can reduce network traffic and utilization of computing resources associated with the centralized server as a request for content might not need to be transmitted from the edge device to the origin device. The content server device can also reduce utilization of computing resources associated with the edge device based on the content server device formatting the content with regard to the edge device and/or the television.

As indicated above, FIGS. 1A and 1B are provided merely as an example. Other examples are possible and can differ from what was described with regard to FIGS. 1A and 1B.

Figure 2:
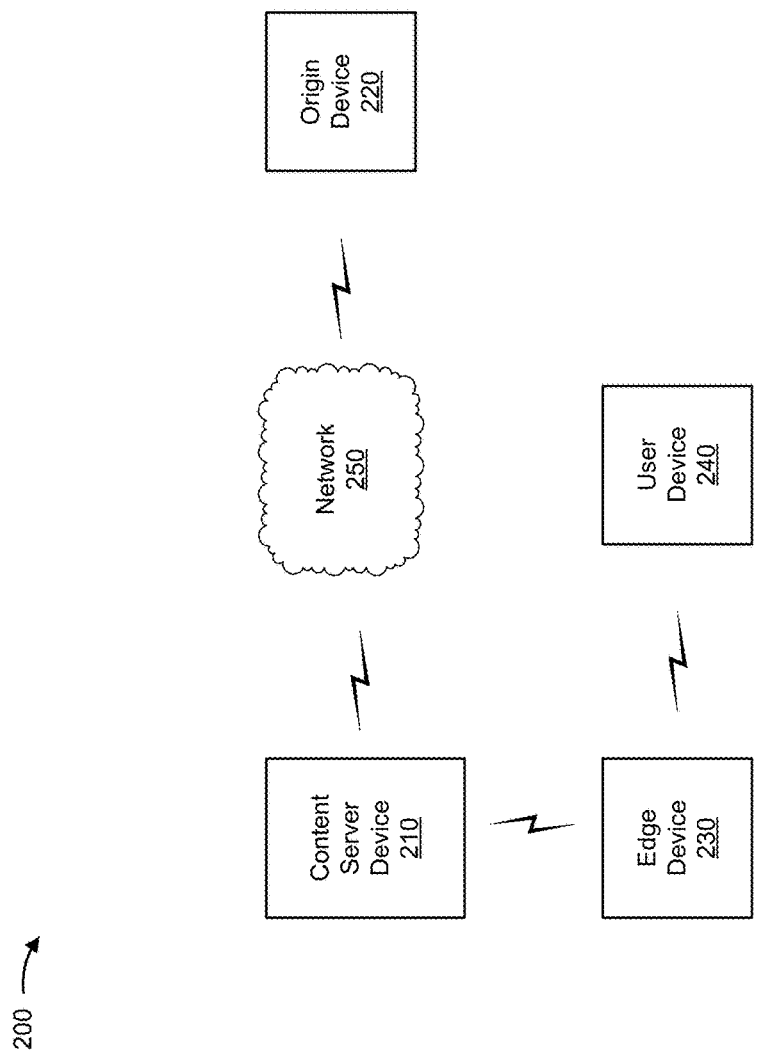
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include content server device 210, origin device 220, edge device 230, user device 240, and network 250. Devices of environment 200 can interconnect via wired connections, wireless connections, or a combination of wired and wireless connections.

Content server device 210 includes a device capable of receiving content from a source of the content (e.g., origin device 220), storing the content locally (e.g., in main memory, in cache memory, in secondary memory, etc.) on content server device 210 and/or on a storage component (e.g., tertiary storage, a hard disk drive (HDD), etc.) associated with content server device 210, and providing the content to another device (e.g., edge device 230, a server device, etc.). In some implementations, content server device 210 can be capable of formatting content received from origin device 220 into a format associated with content server device 210, edge device 230, and/or user device 240.

For example, content server device 210 can include a server device, a group of server devices, a media server, a data center (e.g., a multi-server micro data center), a workstation computer, a virtual machine (VM) provided in a cloud computing environment, and/or a similar type of device.

Origin device 220 includes one or more devices capable of originating, generating, and/or storing content, receiving requests for the content, and providing the content to content server device 210 and/or edge device 230. For example, origin device 220 can include a server device, a centralized server, a media server, a media streamer device, a group of server devices, one or more devices of a cloud environment, and/or a similar type of device.

Edge device 230 includes one or more devices capable of receiving content from content server device 210, storing the content locally (e.g., in main memory, in cache memory, in secondary memory, etc.) on edge device 230 and/or on a storage component (e.g., tertiary storage, a hard disk drive (HDD), etc.) associated with edge device 230, and providing the content to user device 240. For example, edge device 230 can include a gateway, a gateway node, an edge node, an edge server, a server device, a group of server devices, a data center (e.g., a multi-server micro data center), a workstation computer, a VM provided in a cloud computing environment, a router, a switch, a hub, and/or a similar type of device. In some implementations, edge device 230 can be geographically closer to user device 240 than content server device 210 and origin device 220. In other words, edge device 230 can be located at an edge position of a network associated with content server device 210 and/or origin device 220. In some implementations, at least one other device (e.g., a server device) can be located between edge device 230 and user device 240. In other words, edge device 230 can be in an intermediate position in a network associated with content server device 210 and/or origin device 220.

User device 240 includes one or more devices capable of receiving, storing, processing, and/or providing content received from edge device 230. For example, user device 240 can include a display device, a video wall, a television, a computer monitor, a smart phone, a tablet computer, a laptop computer, a desktop computer, a set top box, a smart television, a projector, and/or the like. In some implementations, user device 240 can include edge device 230. In some implementations, user device 240 can be a component of a display device.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of next generation network (NGN), etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
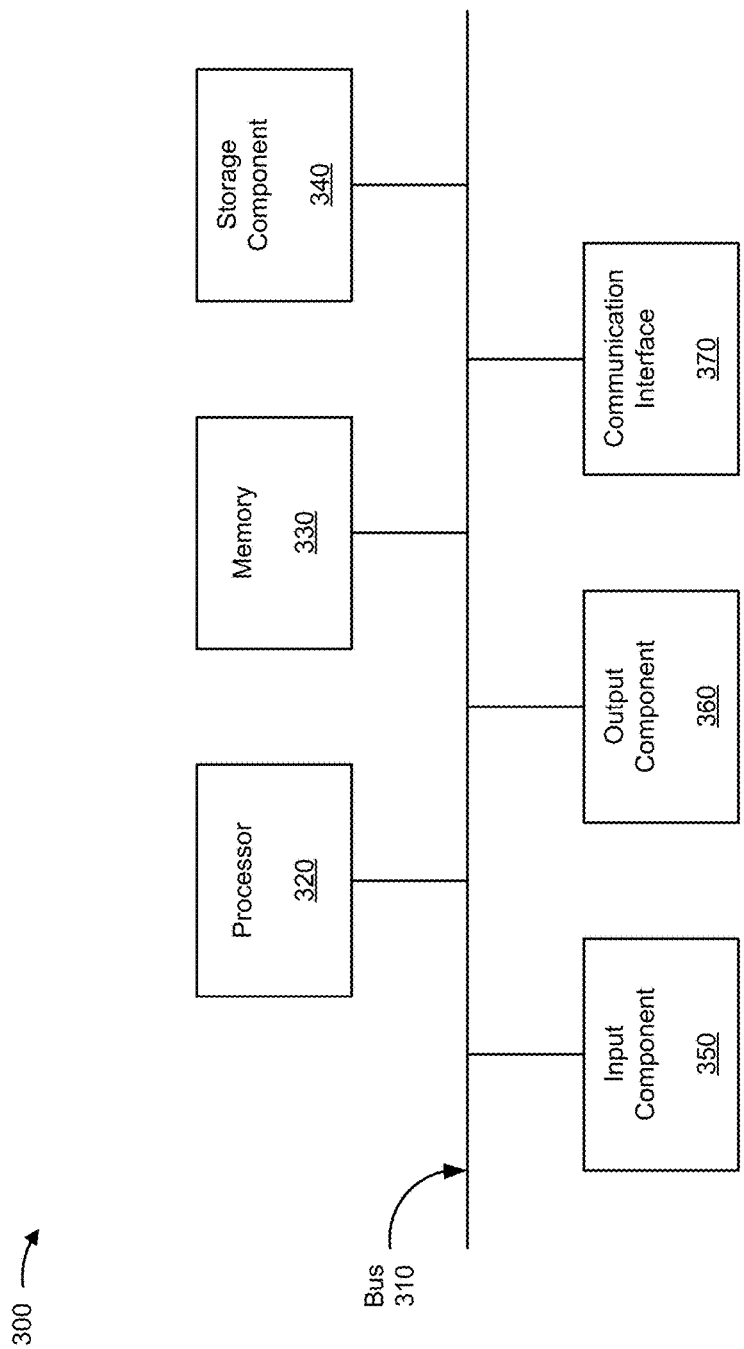
FIG. 3 is a diagram of example components of one or more devices of FIG. 2.

FIG. 3 is a diagram of example components of a device 300. Device 300 can correspond to content server device 210, origin device 220, edge device 230, and/or user device 240. In some implementations, content server device 210, origin device 220, edge device 230, and/or user device 240 can include one or more devices 300 and/or one or more components of device 300. As shown in FIG. 3, device 300 can include bus 310, processor 320, memory 330, storage component 340, input component 350, output component 360, and communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, and/or the like.

Device 300 can perform one or more processes described herein. Device 300 can perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

FIG. 4 is a flow chart of an example process 400 for proactively providing content to an edge device. In some implementations, one or more process blocks of FIG. 4 can be performed by content server device 210. In some implementations, one or more process blocks of FIG. 4 can be performed by another device or a group of devices separate from or including content server device 210, such as origin device 220, edge device 230, and/or user device 240.

As shown in FIG. 4, process 400 can include obtaining content from an origin device (block 410). For example, content server device 210 can obtain (e.g., proactively) the content from origin device 220. In some implementations, the content can include any content that can be provided via user device 240 (e.g., video, audio, text, a video call, an audio call, linear video, live content, live streaming media, live video, live audio, live television, recorded content, gaming content, on-demand streaming media, interactive content, web objects, downloadable objects, applications, social media information, etc.). For example, the content can include linear video associated with a broadcast television channel that is streamed over the Internet. In some implementations, content server device 210 can obtain content from origin device 220 based on a request from content server device 210. For example, content server device 210 can receive the linear video from origin device 220 based on a request from content server device 210. In some implementations, the content can be divided into portions. For example, content server device 210 can receive portions of linear video from origin device 220.

In some implementations, content server device 210 can obtain the content from origin device 220 proactively. For example, content server device 210 can obtain the content independent of a request for the content (e.g., before a user device 240 requests the content). In some implementations, content server device 210 can obtain the content based on a communication from origin device 220, edge device 230, and/or user device 240. For example, origin device 220 can provide a communication to content server device 210 to indicate that new content is available and that content can be provided to content server device 210.

In some implementations, content server device 210 can identify edge device 230 and/or user device 240. For example, content server device 210 can identify user device 240 to potentially receive the content. In some implementations, content server device 210 can identify one user device 240 out of a plurality of user devices 240. In some implementations, content server device 210 can identify edge device 230 associated with user device 240. For example, content server device 210 can identify edge device 230 that is associated with user device 240 based on a communication received from edge device 230 (e.g., edge device 230 can notify content server device 210 of one or more user devices 240 with which edge device 230 is associated). In some implementations, content server device 210 can identify one edge device 230 out of a plurality of edges device 230.

In some implementations, content server device 210 can obtain (e.g., proactively) the content based on a push mechanism (e.g., without content server device 210 having to request the content). For example, content server device 210 can receive the content based on a unicast method, a broadcast method, and/or a multicast method of communication from origin device 220. In some implementations, content server device 210 can receive the content based on a streaming method such as Internet Protocol (IP) unicast, an IP broadcast, and/or an IP multicast. In some implementations, origin device 220 can include a media streamer device that can provide content via a multicast method. For example, the media streamer device can provide content to two or more content server devices 210 simultaneously. In some implementations, one of content server devices 210 can be connected to a parent cache device (e.g., edge device 230) and the parent cache device is connected to another device another content server device 210 or origin device 220. In some implementations, the content server device 210 can provide an indication that content is to be provided to the parent cache device, can receive a request for the content from the parent cache device based on the indication, and can provide the content to the parent cache device based on the request for the content.

In some implementations, content server device 210 can obtain (e.g., proactively) the content based on a pull mechanism (e.g., based on content server device 210 requesting the content). For example, content server device 210 can provide a request for the content to origin device 220 utilizing a method associated with Hypertext Transfer Protocol (HTTP) (e.g., a POST request method, a GET request method, etc.) and/or File Transfer Protocol (FTP). In addition, content server device 210 can receive the content based on the request to origin device 220.

In some implementations, content server device 210 can proactively obtain the content regularly, periodically, or non-periodically. For example, origin device 220 might constantly stream the content (e.g., in the case of streaming television content) and content server device 210 can tune to and/or configure to accept the streaming content. In some implementations, content server device 210 can proactively obtain the content periodically by providing a request for the content to origin device 220 at a preconfigured time intervals (e.g., every 2 seconds, 10 seconds, 30 seconds, 1 minute, 2 minutes, 15 minutes, etc.).

In some implementations, content server device 210 can proactively obtain the content non-periodically based on information associated with the content (e.g., when the content ends, when the content begins, duration of the content, etc.), based on information associated with the user of user device 240 (e.g., user preferences, a user's demographic, etc.), based on information associated with content server device 210, origin device 220, edge device 230, and/or user device 240 (e.g., remaining memory capacity of content server device 210, remaining memory capacity of edge device 230, etc.), and/or a combination thereof (e.g., every 20 seconds unless the remaining memory capacity of content server device 210 is below 50%, then every 40 seconds, etc.).

By obtaining the content non-periodically, content server device 210 can reduce network traffic and utilization of computing resources associated with obtaining content from origin device 220 in comparison to regularly or periodically obtaining content from origin device 220.

In some implementations, content server device 210 can obtain the content based on performing a computer-implemented technique. For example, content server device 210 can use one or more machine learning techniques to analyze data (e.g., training data, such as information that is associated with the content, content server device 210, edge device 230, user device 240, the user of user device 240, etc.) and to create one or more models associated with content server device 210 obtaining content (e.g., proactively) from origin device 220. In some implementations, the criteria involved in creating the one or more models can be based on the content that is most popular for the user and/or other users, a predicted interest of the user and/or of other users in the content, past viewing behavior of the user and/or of other users, the content being on a channel that is available for viewing based on a subscription, the subject matter of content provided by a channel currently being accessed, the content that is newly created, and/or the like.

By creating models based on the content that is most popular, based on a predicted interest in the content, based on past behavior of content accesses, based on the content being on a channel that is available for viewing based on a subscription, based on the subject matter of content provided by a channel currently being accessed, and/or based on the content that is newly created, content server device 210 can proactively obtain content that is most likely to be accessed by the user and/or other users and can avoid obtaining content that might not or cannot be accessed by the user and/or other users.

In some implementations, content server device 210 can apply different weights to the criteria that is used in creating the one or more models. For example, the content being on a channel that is available for viewing based on a subscription can be given more weight than the subject matter of content provided by a channel currently being accessed.

The computer-implemented techniques can include, for example, supervised and/or unsupervised techniques, such as artificial networks, case-based reasoning, Bayesian statistics, learning automata, Hidden Markov Modeling, linear classifiers, quadratic classifiers, decision trees, association rule learning, and/or the like. In some implementations, the data used to train a model is a first set of data and content server device 210 uses the model to obtain the content based on a second set of data that is different from the first set of data.

Additionally, or alternatively, content server device 210 can use another kind of computer-implemented technique, such as artificial intelligence, machine perception, or computer vision, to analyze data and generate models associated with content server device 210 obtaining the content. For example, content server device 210 can receive information associated with the content, content server device 210, origin device 220, edge device 230, user device 240, the user of user device 240, other users, and/or the like, and can implement the computer-implemented technique (e.g., to train a model). Content server device 210 can also receive additional information (e.g., additional information associated with the content, content server device 210, origin device 220 edge device 230, user device 240, the user of user device 240, other users, etc.) and can obtain the content based on the model. Additionally, or alternatively, content server device 210 can implement big data analytics techniques such as analyzing thousands, millions, or billions of data points (e.g., information associated with the content, content server device 210, origin device 220, edge device 230, user device 240, the user, other users, etc.) to train the model and/or to obtain the content.

By obtaining the content based on performing a computer-implemented or big data analytics technique, content server device 210 can increase the efficiency of the process of obtaining the content and/or can increase the accuracy of the content obtained, thus reducing an amount of processing associated with obtaining the content. Accordingly, implementations described herein can conserve processor and/or memory resources of content server device 210 and/or data structures associated with content server device 210 obtaining the content.

In some implementations, content server device 210 and/or edge device 230 can receive information regarding a user associated with user device 240 (e.g., information associated with user preferences, etc.). For example, content server device 210 can receive information associated with user preferences based on a subscription service for content provided to the user. In some implementations, edge device 230 can receive information associated with user preferences based on a prompt provided to user device 240 before and/or after edge device 230 provides content to user device 240.

In some implementations, content server device 210 can format the content. For example, content server device 210 can format the content based on information associated with the content, content server device 210, edge device 230, user device 240, a user associated with user device 240, or a combination thereof. In some implementations, content server device 210 can format the content based on a predicted destination of the content. For example, content server device 210 can format the content based on edge device 230 and/or user device 240. In some implementations, content server device 210 can format the content so that the content can be received and presented (e.g., displayed) on user device 240. In some implementations, content server device 210 can format the content based on a resolution, an aspect ratio, a video file format, an audio file format, a video codec used, and/or the like, associated with edge device 230 and/or user device 240.

In some implementations, content server device 210 can modify a format of the content. For example, content server device 210 can modify the format of the content based on a format that is acceptable to edge device 230 and/or user device 240. In some implementations, content server device 210 can modify the format of the content to match a format acceptable to edge device 230 and/or user device 240. In some implementations, content server device 210 can format the content by assembling the content based on information associated with edge device 230 and/or user device 240. For example, content server device 210 can receive the content as a plurality of packets of live video, can assemble the packets into a full size segment of live video, and can provide the full size segment of live video to edge device 230. In some implementations, content server device 210 can format the content with regard to authentication information for edge device 230 and/or user device 240. For example, content server device 210 can format the content to include token authentication information associated with edge device 230. In some implementations, edge device 230 can format the content for user device 240. In some implementations, content server device 210, origin device 220, and/or edge device 230 can encrypt the content. For example, content server device 210 can encrypt the content before providing the content to edge device 230 and/or edge device 230 can encrypt the content before providing the content to user device 240.

In some implementations, content server device 210 can provide (e.g., proactively) content to edge device 230 after the format of the content is modified. For example, content server device 210 can proactively provide the content to edge device 230 after the format of the content is modified based on the format being acceptable to user device 240. In some implementations, content server device 210 can store the content locally (e.g., in main memory, in cache memory, in secondary memory, etc.) on content server device 210 and/or on a storage component (e.g., tertiary storage, a hard disk drive (HDD), etc.) associated with content server device 210 based on the modified format of the content.

By formatting the content, content server device 210 can reduce network traffic and utilization of computing resources, associated with edge device 230 and/or user device 240, used to format the content.

In some implementations, content server device 210 and/or edge device 230 can store the content. For example, content server device 210 can store the content based on receiving the content from origin device 220. In some implementations, content server device 210 and/or edge device 230 can store the content locally (e.g., in main memory, in cache memory, secondary memory, etc.) on content server device 210 and/or edge device 230 and/or on a storage component (e.g., tertiary storage, a hard disk drive (HDD), etc.) associated with content server device 210 and/or edge device 230. For example, content server device 210 can store the content in cache memory of content server device 210.

By storing content in the cache memory of content server device 210 and/or edge device 230, content server device 210 and/or edge device 230 can provide content with less time delay than if the content were stored in main memory of content server device 210 and/or edge device 230.

In some implementations, content server device 210 and/or edge device 230 can overwrite and/or remove (e.g., delete, clear, etc.) the content that is stored. For example, content server device 210 can overwrite content that has been stored in cache memory after a predetermined period of time. In some implementations, content server device 210 and/or edge device 230 overwrite and/or remove the content that is stored based on information associated the content, content server device 210 edge device 230, user device 240, and/or a user associated with user device 240. For example, content server device 210 can overwrite content that has been stored in cache memory based on a remaining memory capacity of content server device 210 and based on content that is obtained from origin device 220.

In some implementations, content server device 210 can implement (e.g., host) a server application associated with the content. For example, content server device 210 can implement the server application that is associated with content obtained from origin device 220. The server application can be a software functionality of content server device 210 for providing the content. In some implementations, content server device 210 can associate the content with the server application. For example, content server device 210 can assign the content to an instance of the server application implemented by content server device 210.

In some implementations, content server device 210 can implement a plurality of instances (e.g., 10, 20, 30, 100, etc.) of the server application. For example, content server device 210 can host the plurality of instances of the server application where each instance of the plurality of instances corresponds to unique content (e.g., a unique linear video channel, a unique live television channel, etc.) that content server device 210 can obtain from origin device 220. In some implementations, each instance of the server application can be associated with an identifier (e.g., a unique identifier, a Transmission Control Protocol (TCP) port identifier, a Uniform Resource Identifier (URI), a private address space, etc.). For example, the identifier, associated with an instance of the server application, can be the TCP port identifier that the instance is listening on for content from origin device 220.

By providing an identifier for each instance of a server application that is associated with unique content, content server device 210 can reduce network traffic and utilization of computing resources associated with exchanging content between content server device 210 and edge device 230 as content server device 210 and/or edge device 230 can more quickly identify a location of content as compared when the identifier is not provided.

In some implementations, content server device 210 can be associated with a plurality of edge devices 230, and each of the plurality of edge devices can be associated with a plurality of user devices 240. In addition, each of the plurality of user devices 240 can be associated with one or more users. In such a case, content server device 210 can obtain the content (e.g., proactively) from origin device 220 based on all or some of the plurality of edge devices 230 associated with content server device 210, all or some of the plurality of user devices 240 associated with each of the plurality of edge devices 230, and/or all or some of the plurality of users associated with the plurality of user devices 240. In some implementations, content server device 210 can provide the content (e.g., proactively) to edge device 230 based on all or some of the plurality of edge devices 230 associated with content server device 210, all or some of the plurality of user devices 240 associated with each of the plurality of edge devices 230, and/or all or some of the plurality of users associated with the plurality of user devices 240.

In some implementations, content server device 210 can provide (e.g., proactively) the same or different communications associated with the content to each of the plurality of edge devices 230. For example, content server device 210 can provide a communication to a first edge device 230 that is different from a communication provided to a second edge device 230. The communication to the first edge device 230 can include a first list associated with a first subset of the content obtained by content server device 210 and the communication to the second edge device 230 can include a second list associated with a second subset of the content obtained by content server device 210, where the first subset is different than the second subset.

In this way, content server device 210 can obtain content from an origin device.

As further shown in FIG. 4, process 400 can include providing a first communication to an edge device, where the first communication includes an indication that the content is to be provided to the edge device (block 420). For example, content server device 210 can provide a first communication to edge device 230 and the first communication can include information associated with an indication that the content is to be provided to edge device 230. In some implementations, content server device 210 can provide the first communication to cause edge device 230 to provide a second communication to content server device 210. For example, the first communication can cause edge device 230 to request the content from content server device 210.

In some implementations, content server device 210 can proactively provide the first communication to edge device 230. For example, content server device 210 can provide the first communication to edge device 230 independent of a request for the content by edge device 230.

In some implementations, content server device 210 can generate a ranking and/or a prediction score indicating how likely edge device 230 and/or user device 240 is to request the content from content server device 210. The ranking and/or the prediction score can be based on information associated with a user of user device 240 (e.g., user preferences, frequency with which the user requests the content, frequency with which the user requests a type of content, whether the user has access to a subscription service associated with the content, etc.) and/or the content (e.g., type of content, length of content, frequency of requests for the content, etc.). Additionally or alternatively, content server device 210 can determine the ranking and/or the prediction score based on information associated content server device 210 (e.g., requests received from edge device 230 for the content, type of content for which requests are most often received, etc.), edge device 230 (e.g., requests received from user device 240 for the content, requests provided to content server device 210 for the content, etc.), user device 240 (e.g., requests provided to edge device 230 for the content, type and/or subject matter of content for which requests to edge device 230 are most often provided, format of content that is acceptable, etc.), and/or other users (e.g., information associated with users with similar user preferences, types of content requested by other users, etc.). In some implementations, content server device 210 can apply different weights to the criteria that are used in generating the ranking and/or the prediction score. For example, the frequency of requests for the content can be given more weight than the types of content requested by other users. In some implementations, content server device 210 can generate the ranking and/or the prediction score using a technique (e.g., a computer-implemented technique, a big data analytics technique, etc.), such as one of the techniques discussed above. In some implementations, content server device 210 can include the ranking and/or prediction score in the first communication.

In some implementations, content server device 210 can provide the first communication that includes a request (e.g., an HTTP request) to edge device 230. For example, content server device 210 can provide the request to edge device 230 to indicate that content server device 210 has the content that is to be provided to edge device 230.

In some implementations, the first communication can include information associated with the content such as an identifier, a unique identifier, an IP address, a Uniform Resource Locator (URL), and/or the like, to be received by edge device 230. Additionally or alternatively, the first communication can include information associated with the unique identifier of the instance of the server application associated with the content. For example, the first information can include a URL associated with a segment of linear video and the unique identifier of the instance of the server application associated with the segment of linear video. In some implementations, the first communication can include a list associated with the content obtained from origin device 220. For example, the first communication can include a manifest list associated with the content that is to be provided to edge device 230.

By providing (e.g., proactively) the first communication to edge device 230, content server device 210 can reduce network traffic and utilization of computing resources associated with edge device 230 initiating a request for the content from content server device 210.

In some implementations, content server device 210 can proactively provide the first communication periodically or non-periodically. For example, content server device 210 can provide the first communication periodically based on a preconfigured time interval (e.g., every 2 seconds, 10 seconds, 30 seconds, 1 minute, 2 minutes, 15 minutes, etc.).

In some implementations, content server device 210 can proactively provide the first communication non-periodically based on information associated with the content (e.g., when the content ends, when the content begins, duration of the content, etc.), based on information associated with the user of user device 240 (e.g., user preferences, a user's demographic, etc.), based on information associated with content server device 210, origin device 220, edge device 230, and/or user device 240 (e.g., a remaining memory capacity of content server device 210, a remaining memory capacity of edge device 230, etc.), and/or a combination thereof (e.g., every 20 seconds unless the remaining memory capacity of content server device 210 is below 50%, then every 10 seconds).

By proactively providing the first communication periodically or non-periodically, content server device 210 can cause up to date content to be provided to edge device 230. In addition, by proactively providing the first communication non-periodically, content server device 210 can reduce network traffic and utilization of computing resources associated with providing the first communication to edge device 230 in comparison to periodically providing the first communication to edge device 230.

In some implementations, content server device 210 can provide (e.g., proactively) the first communication based on performing a computer-implemented technique. For example, content server device 210 can use one or more machine learning techniques to analyze data (e.g., training data, such as information that is associated with the content, content server device 210, origin device 220, edge device 230, user device 240, the user of user device 240, other users, etc.) and create one or more models associated with content server device 210 providing the first communication.

In some implementations, the criteria involved in creating the one or more models can be based on, for example, the content that is most often provided to edge device 230 and/or user device 240, a type of content that is to be provided to edge device 230 and/or user device 240, hardware and/or software parameters of edge device 230 and/or user device 240, a format of content that is acceptable to edge device 230 and/or user device 240, and/or the like.

By creating models to provide the first communication to edge device 230 based on the content that is most often provided to edge device 230 and/or user device 240, a type of content that is to be provided to edge device 230 and/or user device 240, hardware and/or software parameters of edge device 230 and/or user device 240, and/or a format of content that is acceptable to edge device 230 and/or user device 240, content server device 210 can reduce network traffic and utilization of computing resources associated with content server device 210 providing the first communication and edge device 230 receiving the first communication.

In some implementations, content server device 210 can apply different weights to the criteria that is used in creating the one or more models. For example, the content that is most often requested by edge device 230 can be given more weight than the type of content that is to be provided to edge device 230.

The computer-implemented techniques can include, for example, supervised and/or unsupervised techniques, such as artificial networks, case-based reasoning, Bayesian statistics, learning automata, Hidden Markov Modeling, linear classifiers, quadratic classifiers, decision trees, association rule learning, and/or the like. In some implementations, the data used to train a model is associated with a first set of data and content server device 210 uses the model to provide the first communication based on a second set of data that is different from the first set of data.

Additionally, or alternatively, content server device 210 can use another kind of computer-implemented technique, such as artificial intelligence, machine perception, or computer vision, to analyze data and generate models associated with providing the first communication. For example, content server device 210 can receive information associated with the content, content server device 210, origin device 220, edge device 230, user device 240, the user of user device 240, other users, and/or the like, and can implement the computer-implemented technique (e.g., to train a model). Content server device 210 can also receive additional information (e.g., additional information associated with the content, content server device 210, origin device 220, edge device 230, user device 240, the user, other users, etc.) and can provide the first communication based on the model. Additionally, or alternatively, content server device 210 can implement big data analytics techniques (e.g., analyzing thousands, millions, or billions of data points (e.g., information associated with the content and/or the user, etc.)) to train the model and/or to provide the first communication.

By providing the first communication based on performing a computer-implemented or big data analytics technique, content server device 210 can increase the efficiency of the process of providing the first communication, thus reducing an amount of processing associated with providing the first communication. Accordingly, implementations described herein can conserve processor and/or memory resources of content server device 210 and/or data structures associated with content server device 210 providing the first communication.

In some implementations, content server device 210 can provide the first communication based on all or some of a plurality of edge devices 230 associated with content server device 210, all or some of a plurality of user devices 240 associated with each of the plurality of edge devices 230, and/or all or some of the plurality of users associated with the plurality of user devices 240. In some implementations, content server device 210 can provide a first communication to one of the plurality of edge devices 230 that is the same or different as a first communication to another of the plurality of edge devices 230. For example, content server device 210 can provide a first communication to a first edge device 230 that is different from a first communication provided to a second edge device 230. The communication to the first edge device 230 can include a first list associated with the content obtained by content server device 210 and the communication to the second edge device 230 can include a second list that is different than the first list.

In this way, content server device 210 can provide a first communication to an edge device, where the first communication includes an indication that the content is to be provided to the edge device.

As further shown in FIG. 4, process 400 can include receiving a second communication that includes a request for the content based on the first communication (block 430). For example, content server device 210 can receive a second communication from edge device 230 and the second communication can include the request for the content based on the first communication.

In some implementations, the second communication can include a request for the content from edge device 230 so that content server device 210 can provide the content to edge device 230. For example, the request can include information provided in the first communication (e.g., the URL of the content, the unique identifier associated with the instance of the server application, etc.) so that content server device 210 can determine the content to provide to edge device 230.

In some implementations, content server device 210 can receive the second communication based on the first communication. For example, the first communication can cause edge device 230 to provide the second communication within a predetermined time period (e.g., 5 seconds, 10 seconds, 30 seconds, 1 minute, 10 minutes, etc.). In some implementations, content server device 210 can receive the second communication from a proxy server associated with edge device 230. For example, content server device 210 can receive the second communication from a proxy server that communicates with edge device 230.

In some implementations, edge device 230 can receive the first communication. For example, edge device 230 can receive the first communication from content server device 210. In some implementations, edge device 230 can provide the second communication. For example, edge device 230 can provide the second communication to content server device 210 based on the first communication. In some implementations, edge device 230 can provide the second communication to content server device 210 based on information associated with the first communication. For example, edge device 230 can provide the second communication to content server device 210 based on an address of content server device 210 included in the first communication.

In some implementations, edge device 230 can determine an address (e.g., a device address, a network address, etc.) associated with content server device 210 based on the first communication. For example, edge device 230 can be associated with a data structure (e.g., a database) that includes a list of the unique identifiers associated with instances of the server application implemented by content server device 210 and a network name associated with content server device 210. In some implementations, edge device 230 can include the address associated with content server device 210 in the second communication.

In some implementations, edge device 230 can determine a network name associated with content server device 210. For example, edge device 230 can determine the network name by comparing the list to a unique identifier for an instance of the server application included in the first communication. In some implementations, edge device 230 can determine a network address (e.g., IP address) associated with content server device 210. For example, edge device 230 can use a Domain Name Server (DNS) lookup on the network name associated with content server device 210 to determine the IP address associated with content server device 210. In some implementations, edge device 230 provides the second communication to content server device 210 based on the network address determined by edge device 230.

In some implementations, edge device 230 can provide the second communication to content server device 210 periodically or non-periodically. For example, edge device 230 can provide the second communication to content server device 210 periodically by providing the second communication at a preconfigured time interval (e.g., every 2 seconds, 10 seconds, 30 seconds, 1 minute, 2 minutes, 15 minutes, etc.).

In some implementations, edge device 230 can provide the second communication non-periodically based on information associated with the content to be provided to edge device 230 (e.g., when the content ends, when the content begins, duration of the content, etc.), based on information associated with the user of user device 240 (e.g., user preferences, a user's demographic, etc.), based on information associated with content server device 210, origin device 220, edge device 230, and/or user device 240 (e.g., a remaining memory capacity of content server device 210, a remaining memory capacity of edge device 230, etc.), and/or a combination thereof (e.g., every 20 seconds unless the remaining memory capacity of edge device 230 is below 50%, then every 40 seconds).

By providing the second communication non-periodically, edge device 230 can reduce network traffic and utilization of computing resources associated with edge device 230 providing the second communication in comparison to edge device 230 periodically providing the second communication.

In some implementations, edge device 230 can provide the second communication to content server device 210 based on a request for content from user device 240. For example, edge device 230 can provide the second communication after edge device 230 receives the request for content from user device 240. In some implementations, edge device 230 can provide the second communication that includes a request for content that corresponds to the content requested by user device 240.

In some implementations, content server device 210 can receive a second communication based on all or some of a plurality of edge devices 230 associated with content server device 210, all or some of a plurality of user devices 240 associated with each of the plurality of edge devices 230, and/or all or some of the plurality of users associated with the plurality of user devices 240. In some implementations, content server device 210 can receive a second communication from one of the plurality of edge devices 230 that is the same or different as a second communication from another of the plurality of edge devices 230. For example, content server device 210 can receive a second communication from a first edge device 230 that is different from a second communication received from a second edge device 230. The second communication received from the first edge device 230 can include a first request for content and the second communication received from the second edge device 230 can include a second request for content that is different than the first request for content.

In this way, content server device 210 can receive a second communication that includes a request for the content based on the first communication.

As further shown in FIG. 4, process 400 can include providing the content to the edge device based on the second communication (block 440). For example, content server device 210 can provide the content to edge device 230 based on the second communication. In some implementations, content server device 210 can provide the content to edge device 230 immediately based on the second communication. In some implementations, content server device 210 can provide the content to edge device 230 after a particular delay (e.g., 5 seconds, 10 seconds, 30 seconds, 1 minute, 10 minutes, etc.) after content server device 210 receives the second communication. In some implementations, content server device 210 can provide the content to edge device 230 at a time based on a time period specified in the second communication.

In some implementations, content server device 210 can proactively provide the content to edge device 230. For example, content server device 210 can proactively provide the content to edge device 230 by providing the content to edge device 230 independent of a request for the content by user device 240.

In some implementations, content server device 210 can provide the content (e.g., proactively) to edge device 230 in a format appropriate for edge device 230 and/or user device 240. For example, content server device 210 can proactively provide the content to edge device 230 as a full size segment of linear video. In some implementations, edge device 230 can format the content after receiving the content from content server device 210.

In some implementations, edge device 230 can receive the content. For example, edge device 230 can receive the content from content server device 210 based on the second communication. In some implementations, edge device 230 can store the content locally (e.g., in main memory, in cache memory, in secondary memory, etc.) on edge device 230 and/or on a storage component (e.g., tertiary storage, a hard disk drive (HDD), etc.) associated with edge device 230 based on receiving the content from content server device 210. For example, edge device 230 can store the content in cache memory once the content is received from content server device 210. In some implementations, edge device 230 can store the content in cache memory based on information associated with a user of user device 240. For example, edge device 230 can store content in cache memory based on a type of content associated with a user preference of the user.

By storing content in the cache memory of edge device 230, edge device 230 can provide the content with less time delay than if the content were stored in main memory of edge device 230.

In some implementations, edge device 230 can store all of the content in cache memory. For example, edge device 230 can store all of the content received from content server device 210 in cache memory. In some implementations, edge device 230 can store all of the content in cache memory based on a type of the content. For example, edge device 230 can store all of the content in cache memory if the content is a live television stream.

In some implementations, edge device 230 can store some of the content in cache memory. For example, edge device 230 can store some of the content received from content server device 210 in cache memory. In some implementations, edge device 230 can store some content in cache memory and some content in other memory (e.g., main memory, secondary memory, etc.). For example, edge device 230 can store content that is a pre-recorded movie in main memory and edge device 230 can store other content that is live television in cache memory.

In some implementations, edge device 230 can determine what to store in cache memory and/or main memory based on content that edge device 230 and/or content server device 210 predicts to be requested by user device 240. For example, edge device 230 and/or content server device 210 can determine a prediction score indicating how likely user device 240 is to request the content. In some implementations, the content with a higher prediction score can be stored in cache memory of content server device 210 and/or edge device 230 and the content with a lower prediction score can be stored in other memory (e.g., main memory, secondary memory, etc.) of content server device 210 and/or edge device 230. In some implementations, content server device 210 can determine the prediction score and provide the prediction score with the content. In some implementations, edge device 230 can determine the prediction score.

In some implementations, edge device 230 can overwrite stored content with content that is received from content server device 210. For example, edge device 230 can overwrite content stored in cache memory when a remaining memory capacity is insufficient to store new content received from content server device 210. In some implementations, edge device 230 can remove (e.g., delete, clear, etc.) stored content and replace the stored content with new content that is received from content server device 210.

In some implementations, content server device 210 and/or edge device 230 can receive content that includes a Time to Live (TTL) parameter. A TTL parameter can include information associated with a time period for which content server device 210 and/or edge device 230 can store the content. For example, edge device 230 can overwrite or remove the content after the TTL parameter has expired. In some implementations, the TTL parameter can be implemented as a counter and/or timestamp attached to and/or embedded in the content.

In some implementations, the TTL parameter of the content can be based on information associated with the content, content server device 210, origin device 220, edge device 230, user device 240, and/or a user of user device 240. For example, the TTL parameter of the content can be based on a type of content requested most often by user device 240. In some implementations, the TTL parameter can be based on a memory capacity of content server device 210, origin device 220, edge device 230, and/or user device 240. In some implementations, the TTL parameter can be the same for all types of content stored by content server device 210 and/or edge device 230. In some implementations, the TTL parameter of the content can be different for one type of content as compared to another type of content. For example, the TTL parameters can be greater for a live television stream than for a pre-recorded video.

In some implementations, edge device 230 can provide the content to user device 240 based on a request for the content from user device 240. For example, edge device 230 can receive the request for the content from user device 240 when a user changes a channel on user device 240 (e.g., a television) and edge device 230 can provide the content to user device 240 based on the request.

In some implementations, content server device 210 can provide the content based on all or some of edge devices 230 associated with content server device 210, all or some of user devices 240 associated with each of the plurality of edge devices 230, and/or all or some of the plurality of users associated with the plurality of user devices 240. In some implementations, content server device 210 can provide content to one of the plurality of edge devices 230 that is the same or different as content provided to another of the plurality of edge devices 230. For example, content server device 210 can provide content to a first edge device 230 that is different from content provided to a second edge device 230. The content provided to the first edge device 230 can include a first type of content that is requested by the first edge device 230 that is different than a second type of content that is requested by the second edge device 230.

In this way, content server device 210 can provide the content to the edge device based on the second communication.

While the preceding description described content server device 210 as providing the content to edge device 230 based on edge device 230 requesting (via the second communication) the content, this need not be the case. In some implementations, content server device 210 can proactively provide the content to edge device 230 (i.e., without edge device 230 having to request the content). For example, content server device 210 can determine content that is likely to be useful to edge device 230 (e.g., likely to be requested by a user device 240 with which edge device 230 is associated) and can provide the content to edge device 230 based on the content being likely to be useful to edge device 230.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

By proactively providing content to an edge device for storing at the edge device prior to a time when a user device requests the content, a content server device can reduce a time delay between when a request for content is made by a user device and when the user device receives the content. Further, by storing content in cache memory, rather than main memory, the content server device and/or the edge device can further reduce the time delay associated with providing the content to the user device. In addition, the content server device can reduce network traffic and utilization of computing resources associated with an origin device as a request for content might not need to be transmitted from the edge device to the origin device that is the source of the content. The content server device can also reduce utilization of computing resources associated with an edge device by formatting the content based on the user device and/or the edge device.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive a first streaming content and a second streaming content from an origin device;
implement a plurality of instances of a server application,
a first instance of the server application being associated with the first streaming content and a second instance of the server application being associated with the second streaming content, and
the first streaming content being different than the second streaming content;
identify an edge device associated with a user device, the user device to potentially receive the first streaming content and the second streaming content;
modify a format of the first streaming content and the second streaming content based on a format acceptable to provide at least one of the first streaming content or the second streaming content to at least one of the edge device or the user device,
the format of the first streaming content and the second streaming content to be modified to match the format acceptable to the at least one of the edge device or the user device; and
provide a first communication to the edge device independent of a request for the first streaming content from the edge device,
the first communication to cause the edge device to request the first streaming content to be provided to the edge device for presentation on the user device, and
the first communication including an identifier associated with the first instance of the server application or the second instance of the server application;
receive a second communication from the edge device based on the first communication,
the second communication including a request from the edge device to cause the first streaming content or the second streaming content to be provided to the edge device based on the identifier associated with the first instance of the server application or the second instance of the server application; and
proactively provide the first streaming content or the second streaming content to the edge device based on the second communication to cause the edge device to make the first streaming content or the second streaming content available to be provided for presentation on the user device,
the first streaming content or second streaming content to be proactively provided to the edge device before the user device requests the first streaming content or the second streaming content from the edge device,
the first streaming content or the second streaming content to be proactively provided to the edge device after the format of the first streaming content or the second streaming content is modified based on the format acceptable to the at least one of the edge device or the user device.

2. The device of claim 1, where the one or more processors are further to:
store the first streaming content in a cache memory based on receiving the first streaming content from the origin device,
the first streaming content to be stored in the cache memory based on the modified format of the first streaming content.

3. The device of claim 1, where the one or more processors are further to:
request the first streaming content and the second streaming content from the origin device; and
where the one or more processors, when receiving the first streaming content and the second streaming content from the origin device, are to:
receive the first streaming content and the second streaming content from the origin device based on the request for the first streaming content and the second streaming content.

4. The device of claim 1, where the identifier is a first identifier, and
where the one or more processors are further to:
assign the first identifier to the first instance of the server application, and
assign a second identifier to the second instance of the server application.

5. The device of claim 1, where the one or more processors are further to:
provide the first streaming content or the second streaming content to the edge device without receiving a request from the edge device for the first streaming content or the second streaming content.

6. The device of claim 1, where the one or more processors are further to:
selectively store the first streaming content in a cache memory based on a prediction of whether the first streaming content will be requested by the user device.

7. The device of claim 1, where the one or more processors are further to:
request the first streaming content and the second streaming content from the origin device based on past viewing behavior; and where the one or more processors, when receiving the first streaming content and the second streaming content from the origin device, are to:
receive the first streaming content and the second streaming content from the origin device based on the request for the first streaming content and the second streaming content.

8. A non-transitory computer-readable medium storing instructions, the instructions comprising:
one or more instructions that, when executed by one or more processors, cause the one or more processors to:
receive a first streaming content and a second streaming content from an origin device,
implement a plurality of instances of a server application,
a first instance of the server application being associated with the first streaming content and a second instance of the server application being associated with the second streaming content, and
the first streaming content being different than the second streaming content;
identify an edge device associated with a user device,
the user device to potentially receive the first streaming content or the second streaming content;
modify a format of the first streaming content and the second streaming content based on a format acceptable to provide at least one of the first streaming content or the second streaming content to at least one of the edge device or the user device,
the format of the first streaming content or the second streaming content to be modified to match the format acceptable to the at least one of the edge device or the user device;
provide a first communication to the edge device independent of a request for the first streaming content from the edge device,
the first communication to cause the edge device to request the first streaming content to be provided to the edge device for presentation on the user device, and
the first communication including an identifier associated with the first instance of the server application or the second instance of the server application;
receive a second communication from the edge device based on the first communication,
the second communication including a request from the edge device to cause the first streaming content or the second streaming content to be provided to the edge device based on the identifier associated with the first instance of the server application or the second instance of the server application; and
proactively provide the first streaming content or the second streaming content to the edge device based on the second communication to cause the edge device to make the first streaming content or the second streaming content available to be provided for presentation on the user device,
the first streaming content or the second streaming content to be proactively provided to the edge device before the user device requests the first streaming content or the second streaming content from the edge device, and
the first streaming content or the second streaming content to be proactively provided to the edge device after the format of the first streaming content and the second streaming content is modified based on the format acceptable to the at least one of the edge device or the user device.

9. The non-transitory computer-readable medium of claim 8, where the first instance of the server application is associated with a first linear video channel, and
where the second instance of the server application is associated with a second linear video channel.

10. The non-transitory computer-readable medium of claim 8, where the one or more instructions, when executed by the one or more processors, further cause the one or more processors to:
store the first streaming content in a cache memory based on receiving the first streaming content from the origin device,
the first streaming content to be stored in the cache memory based on the modified format of the first streaming content.

11. The non-transitory computer-readable medium of claim 8, where the one or more instructions, when executed by the one or more processors, further cause the one or more processors to:
selectively store the first streaming content in a cache memory based on a prediction of whether the first streaming content will be requested by the user device.

12. The non-transitory computer-readable medium of claim 8, where the one or more instructions, when executed by the one or more processors, further cause the one or more processors to:
request the first streaming content and the second streaming content from the origin device based on past viewing behavior; and
where the one or more instructions, that cause the one or more processors to receive the first streaming content and the second streaming content from the origin device, cause the one or more processors to:
receive the first streaming content and the second streaming content from the origin device based on the request for the first streaming content and the second streaming content.

13. The non-transitory computer-readable medium of claim 8, where the identifier is a first identifier, and where the one or more instructions, when executed by the one or more processors, further cause the one or more processors to:
assign the first identifier to the first instance of the server application, and
assign a second identifier to the second instance of the server application.

14. The non-transitory computer-readable medium of claim 8, where the one or more instructions, when executed by the one or more processors, further cause the one or more processors to:
request the first streaming content and the second streaming content from the origin device based on user preference information associated a subscription service; and
where the one or more processors, when receiving the first streaming content and the second streaming content from the origin device, are to:
receive the first streaming content and the second streaming content from the origin device based on the request for the first streaming content and the second streaming content.

15. A method, comprising:
receiving, by a device, a first streaming content and a second streaming content from an origin device;

implementing, by the device, a plurality of instances of a server application,
- a first instance of the server application being associated with the first streaming content and a second instance of the server application being associated with the second streaming content;

identifying, by the device, an edge device associated with a user device,
- the user device to potentially receive the first streaming content or the second streaming content;

modifying, by the device, a format of the first streaming content and the second streaming content based on a format acceptable to provide at least one of the first streaming content or the second streaming content to at least one of the edge device or the user device,
- the format of the first streaming content and the second streaming content to be modified to match the format acceptable to the at least one of the user device or the edge device; and providing a first communication to the edge device independent of a request for the first streaming content from the edge device,
- the first communication to cause the edge device to request the first streaming content to be provided to the edge device for presentation on the user device, and
- the first communication including an identifier associated with the first instance of the server application or the second instance of the server application;

receiving a second communication from the edge device based on the first communication,
- the second communication including a request from the edge device to cause the first streaming content or the second streaming content to be provided to the edge device based on the identifier associated with the first instance of the server application of the second instance of the server application; and providing, proactively, by the device, the first streaming content or the second streaming content to the edge device based on the second communication to cause the edge device to make the first streaming content or the second streaming content available to be provided for presentation on the user device,
- the first streaming content or the second streaming content to be proactively provided to the edge device before the user device requests the first streaming content or the second streaming content from the edge device, and
- the first streaming content or the second streaming content to be proactively provided to the edge device after the format of the first streaming content and the second streaming content is modified based on the format acceptable to the at least one of the user device or the edge device.

16. The method of claim 15, further comprising:

storing the first streaming content in a cache memory after receiving the first streaming content from the origin device.

17. The method of claim 15, further comprising:

requesting the first streaming content and the second streaming content from the origin device based on past viewing behavior; and where receiving the first streaming content and the second streaming content from the origin device comprises:
- receiving the first streaming content and the second streaming content from the origin device based on the request for the first streaming content and the second streaming content.

18. The method of claim 15, further comprising:

requesting the first streaming content and the second streaming content from the origin device based on user preference information associated a subscription service; and where receiving the first streaming content and the second streaming content from the origin device, comprises:
- receiving the first streaming content and the second streaming content from the origin device based on the request for the first streaming content and the second streaming content.

19. The method of claim 15, further comprising:

storing the first streaming content and the second streaming content in a cache memory based on receiving the first streaming content and the second streaming content from the origin device,
- the first streaming content and the second streaming content to be stored in the cache memory based on the modified format of the first streaming content and the second streaming content.

20. The method of claim 15, further comprising:

selectively storing the first streaming content in a cache memory based on a prediction of whether the first streaming content will be requested by the user device.

* * * * *